United States Patent [19]

Merchill

[11] 4,044,724

[45] Aug. 30, 1977

[54] GROOMING AND DISPENSING BRUSH HEAD

[75] Inventor: Geoffrey Leonard Merchill, Solihull, England

[73] Assignee: Hindes Limited, Shirley, England

[21] Appl. No.: 686,059

[22] Filed: May 13, 1976

[51] Int. Cl.$^2$ ............................................. A01K 13/00
[52] U.S. Cl. ...................................... 119/83; 119/93; 119/156; 132/112
[58] Field of Search .................... 119/83, 85, 93, 156, 119/159; 132/112, 113, 114, 115, 116, 120

[56] References Cited

U.S. PATENT DOCUMENTS

| | | | |
|---|---|---|---|
| 1,127,486 | 2/1915 | Midgley | 119/93 |
| 1,748,950 | 3/1930 | Goldberg | 119/93 |
| 2,617,431 | 11/1952 | Gaspari | 132/120 |
| 2,672,875 | 3/1954 | Kovacs | 132/112 |

Primary Examiner—Hugh R. Chamblee
Attorney, Agent, or Firm—Marshall & Yeasting

[57] ABSTRACT

A powder-dispensing brush head comprises a body having first and second angularly related faces, a plurality of bristles distributed over the first face and a passageway extending through the body from an inlet at the second face towards an outlet at the first face of the body. The passageway, as considered from its inlet to its outlet is unidirectional and inclined towards the first face, and the body is provided with at least one coupling formation for connection of the brush head to a flexible-walled container with the mouth of the latter in registry with the inlet. The passageway is smoothly tapered over a major part of its length from a larger diameter adjacent its inlet to a smaller diameter adjacent its outlet.

7 Claims, 5 Drawing Figures

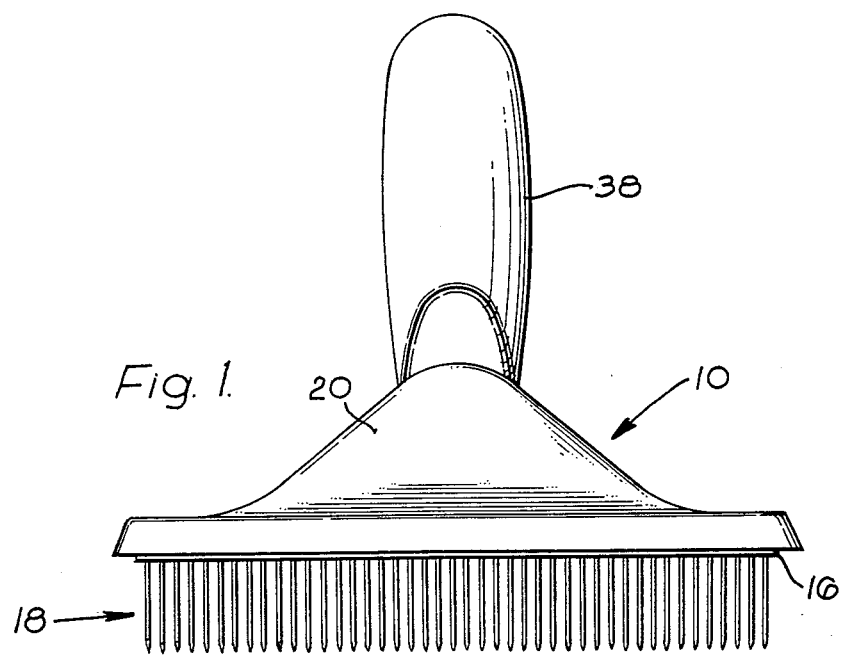
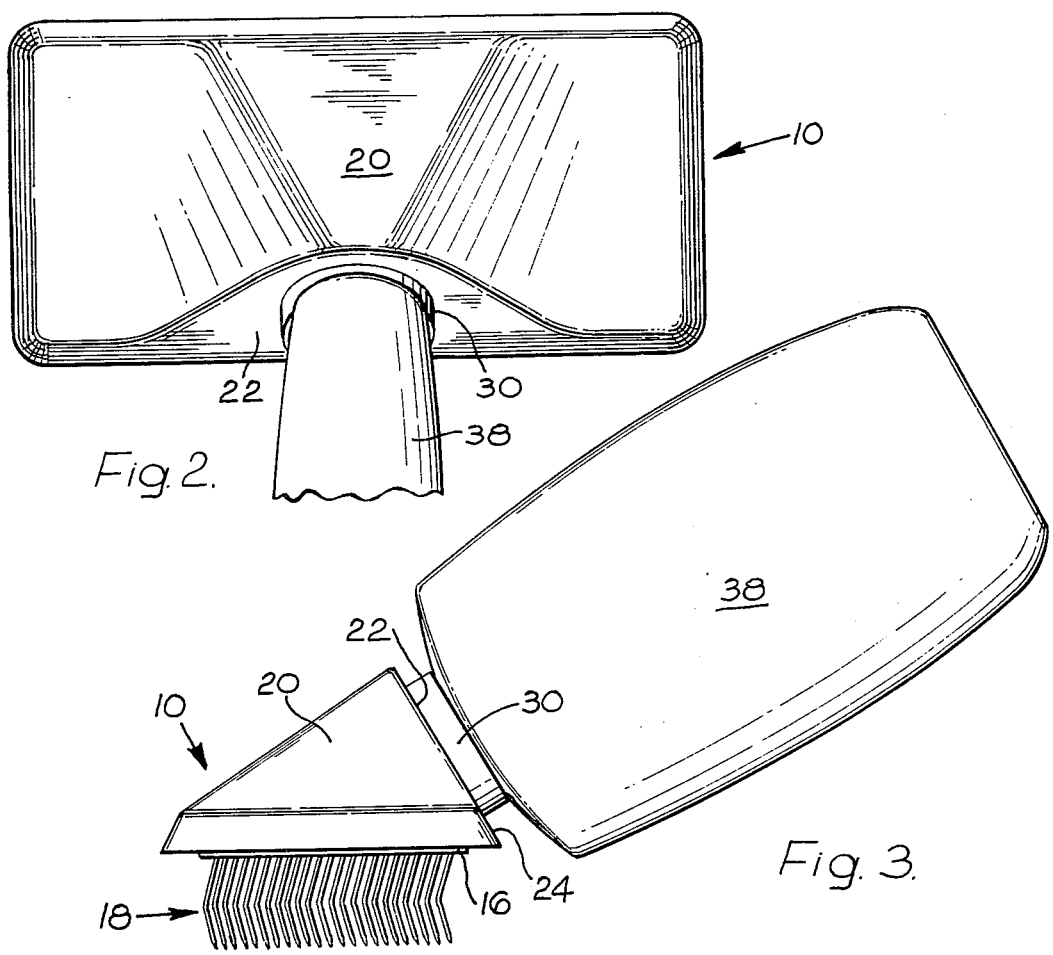

GROOMING AND DISPENSING BRUSH HEAD

BACKGROUND OF THE INVENTION

This invention relates to grooming brushes.

Frequently grooming is accompanied by the application of a treatment or conditioning powder or liquid. For example, it is common practice to apply insecticidal powder to the coats of animals to prevent past infestation and to brush the powder into the coat with the brush. Hitherto this has always been done by using the container of treatment powder separately from the brush, i.e. the powder is first sprinkled on to parts of the animal's coat and that part is subsequently brushed.

SUMMARY OF THE INVENTION

According to the invention we provide a brush head comprising a body having first and second angularly related faces, a plurality of bristles distributed over said face and a passageway extending through said body from an inlet at said second face towards an outlet at or adjacent the first face of the body, a major part of said passageway, as considered from its inlet to its outlet, being inclined towards the first face, the body being provided with at least one coupling formation for connection of the brush head to a flexible-walled container with the mouth of the latter in registry with said inlet.

Thus, in accordance with the invention it is possible to apply a treatment powder (or other powder or liquid) from the flexible-walled container via said passageway in the brush head onto the animal's coat by squeezing the container and this may be accomplished whilst brushing the animal's coat. Also, because the powder may be ejected into the area covered by the bristles of the brush, there is less tendency for the powder to disperse into the air.

It will be understood that the invention is also applicable to the treatment of human hair.

BRIEF DESCRIPTION OF THE DRAWINGS

FIG. 1 is a front elevation of a brush head according to the invention when attached to a container of material to be dispensed during use of the brush head;

FIG. 2 is a plan view of the brush head, part only of the container being illustrated;

FIG. 3 is a side view of the brush head and container combination shown in FIG. 1;

DESCRIPTION OF THE PREFERRED EMBODIMENT

Figure 4:
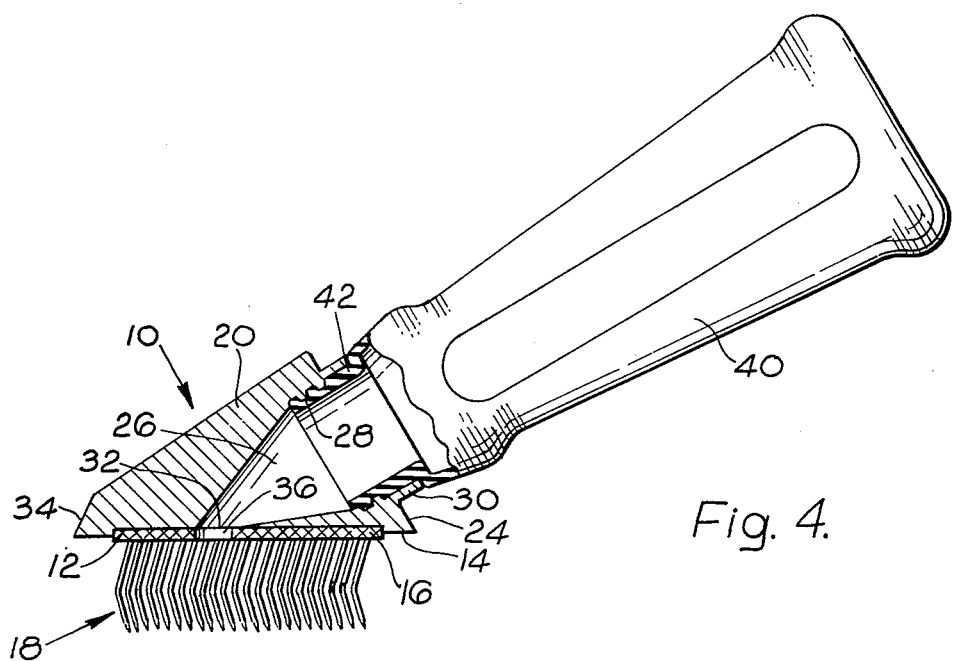
FIG. 4 is a view similar to that of FIG. 2 but showing the brush head in medial section and its use in conjunction with the handle member.
Figure 5:
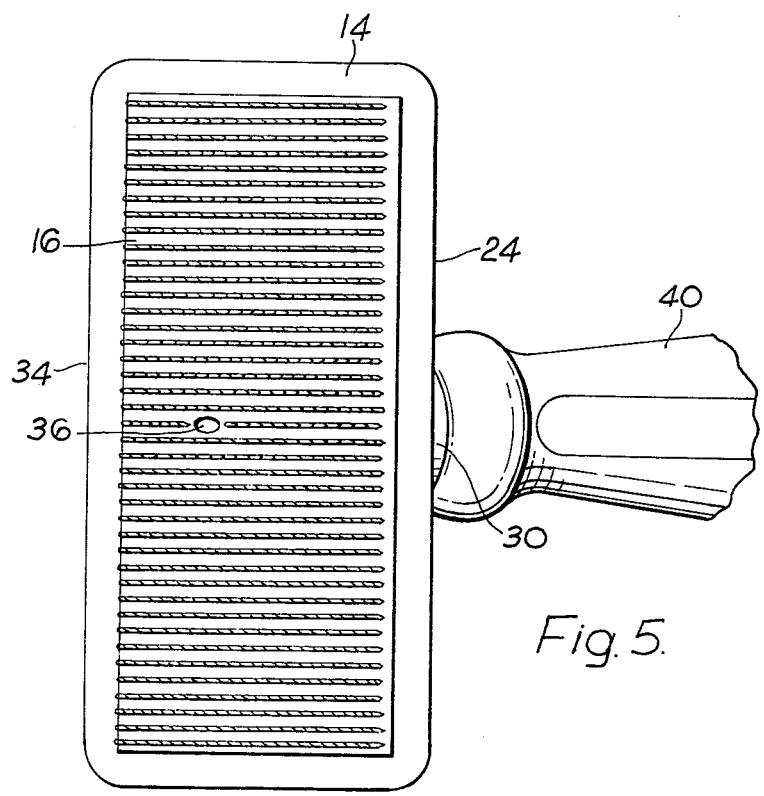
FIG. 5 is an underside view of the brush head and handle combination shown in FIG. 4, the handle member being shown in part only.

Referring now to the drawings, the brush head comprises a portion 10 formed with a flat face 12 (see FIG. 4) of generally rectangular configuration which is bordered by a raised margin 14 and which has a sheet 16 of rubberised canvas fastened thereto within the confines of the margin 14, the sheet 16 carrying a large number of bristles 18 constituted, in the illustrated embodiment, by wires whose free ends are all in the same direction for grooming purposes.

The brush as shown is intended for grooming of animals but it will be understood that the invention is applicable to brushes intended for other purposes, particularly grooming of human hair, and in consequence the bristles may be shaped and arranged differently and/or may be composed of different material, e.g. nylon. Although the sheet 16 is shown to be of greater thickness than the raised margin 14, it may be of lesser or equal thickness, in which latter event the rubberised face thereof will be flush with the margin 14.

Intermediate its ends, the body portion 10 is thickened so as to be of generally triangular configuration as viewed in planes parallel to its major axis and perpendicular to the front face 12, the thickened portion 20 having a generally triangular face 22 which is inclined upwardly from the longitudinal edge 24 towards the central part of the body portion. An open ended passageway 26 extends through the thickened portion 20 from the face 22 to the front face 12. Adjacent the face 22, the passageway 26 comprises a generally cylindrical section formed with an internal screw thread 28 and the open end of the passageway at this face is encircled by an annular collar 30. Beyond the cylindrical, internally threaded section, the passageway 26 tapers in conical fashion and terminates in an opening 32 in the flat face 12.

In the illustrated embodiment, the passageway 26 is symmetrical with respect to a plane passing through the minor medial axis of the body portion and perpendicular to the flat face 12 so that the opening 32 is mid-way between the ends of the brush head and is offset towards the longitudinal edge 34. In a modification, the passageway may be arranged so that it terminates at the flat face 12 in an opening which is mid-way between the edges 24 and 34 or, if desired, closer to the edge 24 than to the edge 34 or which is even at the edge 24 or at the edge 34 (in which case the opening will be adjacent to the flat face 12). In a further modification, the passageway may communicate with two or more openings in or adjacent the flat face 12.

The sheet 16 is formed with an opening 36 in registry with the opening 32 or where the passageway communicates with two or more openings as aforesaid, the sheet 16 is formed with a number of openings in registry with the openings in the body portion 10.

The purpose of the passageway 26 is to allow a treatment or conditioning substance, either in liquid or powder form, to be supplied to the brushing face during use of the brush head. Thus, for example, a flexible walled container 38 of flea powder or the like having an externally screw-threaded neck (not shown) normally closed by a cap, may be connected to the brush head by screwing the neck into the cylindrical section of passageway 26. The container 38 may then be used as a handle to aid manipulation of the brush head. By squeezing the container, the contents thereof can be dispensed a little at a time through the passageway and onto the coat of the animal being brushed. In this way, the treatment powder can be applied at the same time as brushing, thereby avoiding the difficulties encountered when the treatment powder is applied separately.

The brush head is shown with internal screw threads to enable it to be connected to an appropriate container of treatment powder or liquid; this is primarily because such containers are supplied with external screw threads in the neck thereof for connection of a suitable closure cap. However, alternative coupling means are possible; for example: the brush head may be formed with external screw threads encircling a portion thereof through which the passageway extends and the container may be provided with internal screw threads around the mouth; or the brush head and the container may be provided with releasably inter-engageable formations which are arranged so that, when inter-engaged, the passageway in the brush head communicates with the mouth of the container.

In some instances, the brush head may be required for grooming only and a handle 40 may therefore be used with it instead of the flexible walled container 38, the handle having an externally screw-threaded neck 42 which is screwed into the cylindrical section of the passageway 26 in similar manner to the neck of the container 38. In this case, the handle 40 may be of rigid construction. However it is envisaged that the handle may be flexible walled and hollow to allow it to be used as a reservoir for treatment or conditioning powder or liquid, the powder or liquid being introduced into the hollow handle through its neck 42, when disconnected from the brush head, and dispensed by squeezing the handle after it has been reconnected to the brush head.

It will be understood that the brush head described above with reference to the drawings is only the preferred embodiment of the invention and that many modifications in addition to those described above are possible within the scope of the appended claims; for example, the face of the brush head to which the bristles are attached may be of oval or other configuration, and the point of connection between the brush head and the container or handle may be at a position adjacent one end of the head or a position between the longitudinal sides of the brush head with suitable modifications of the body portion of the brush head and the passageway. In the former instance, the passageway may extend with its main axis in generally the same direction as the longitudinal axis of the brush head.

The term "bristle" is used herein in a generic sense to cover not only what are known in the art as bristles, but other grooming projections such as tufts, claws and pins.

I claim:

1. A powder-dispensing brush head comprising a body having first and second angularly related faces, a plurality of relatively stiff bristles distributed over a sheet connected with said first face, a single powder outlet in said first face and said sheet, a powder inlet in said second face, and at least one coupling formation connecting the brush head to a flexible-walled powder container with the mouth of the latter in registry with said inlet, wherein the improvement comprises a passageway leading from said inlet and having only one outlet orifice coinciding with the outlet in said first face, said passageway:
   a. being unidirectional and extending in a straight line from said inlet to said outlet orifice,
   b. extending at an acute angle to said first face, and
   c. being smoothly tapered over a major part of its length from a larger diameter adjacent said inlet to a smaller diameter adjacent said outlet orifice, whereby powder flows smoothly from said inlet to said outlet orifice without clogging.

2. A brush head according to claim 1 in which said coupling formation comprises a screw-thread formation extending around the passageway.

3. A brush head according to claim 1 in which said coupling formation comprises an internal screw-thread formed within the passageway.

4. A brush head according to claim 1 in which the outlet is formed in a central part of said first face.

5. A brush head according to claim 1 in which the bristles are constituted by short lengths of wire whose free ends are all bent in the same direction.

6. A brush head according to claim 1 in which said first face is of oblong or oval configuration having a major axis and a minor axis and in which said passageway has a main axis lying in a plane perpendicular to said first face.

7. A brush head according to claim 1 in which said passageway comprises a cylindrical portion extending from said second face and merging with a conical portion whose apex forms said outlet at said first face.

* * * * *